(12) United States Patent
Liao et al.

(10) Patent No.: US 6,324,312 B1
(45) Date of Patent: Nov. 27, 2001

(54) STRUCTURE AND METHOD FOR FABRICATING A WIDE-ANGLE TE-TM MODE SPLITTER

(75) Inventors: Yu-Pin Liao; Ruei-Chang Lu, both of Taipei Hsien; Way-Seen Wang, Taipei, all of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/451,122

(22) Filed: Nov. 30, 1999

(51) Int. Cl.$^7$ .................................................. G02B 6/00
(52) U.S. Cl. ................ 385/11; 385/45; 385/28; 385/27
(58) Field of Search ............................. 385/11, 45, 29, 385/28, 27

(56) References Cited

U.S. PATENT DOCUMENTS 5,436,992 * 7/1995 Wang et al. .......................... 385/28
5,475,771 * 12/1995 Hosoi ................................... 385/11

FOREIGN PATENT DOCUMENTS 62-36608 * 2/1987 (JP) ..................................... 385/29

* cited by examiner

*Primary Examiner*—Darren Schuberg
*Assistant Examiner*—Fayez Assaf
(74) *Attorney, Agent, or Firm*—Jiawei Huang; J.C. Patents (57) ABSTRACT

A method is used to fabricate a wide-angle Y-branch polarization splitters on lithium niobate crystal substrate. The Y-branch polarization splitter combines a straight waveguide with a substrate prism type wide-angle waveguide branch. The straight waveguide is a random polarization nickel diffusion waveguide. The branching waveguide is a proton exchanged waveguide. The fabrication technology needs only once of nickel diffusion and once of proton exchange. Due to the inherent property of single polarization for the proton exchanged waveguide, only the extraordinary polarization wave is bent and the ordinary wave remains in the straight waveguide. This results in a polarization splitter with high extinction ratio.

7 Claims, 6 Drawing Sheets

STRUCTURE AND METHOD FOR FABRICATING A WIDE-ANGLE TE-TM MODE SPLITTER

BACKGROUND OF THE INVENTION

1. Field of Invention

The present invention relates to a polarization splitter. More particularly, the present invention relates to a structure and a method for fabricating a wide-angle polarization splitter combining a straight waveguide and a branch waveguide.

2. Description of Related Art

A polarization splitter in a waveguide typically is fabricated on a $LiNbO_3$ crystal substrate. Generally, the polarization splitter is divided into two types. One type is called as a direction coupler type that is fabricated according to the modes with different polarization directions and their different coupling lengths. In this manner, the coupling length between two polarization modes needs to satisfy a special requirement in order to obtain the higher extinction ratio, and it therefore needs a small error tolerance in fabrication. Another type of polarization splitter is call a Y-branch type that has a Y-like structure with two different polarization properties, so that two polarization modes can be split into, such as TE and TM modes. The polarization splitter with the Y-branch type, for example, has been disclosed in U.S. Pat. No. 5, 436,992. For the conventional Y-like polarization splitter, if the branching angle is greater than 2 degrees, the propagation loss is very large. This is the reason why the branching angle of the conventional Y-like polarization splitter cannot be effectively reduced. Moreover, a conventional nickel diffusion manner for fabricating the Y-like polarization splitter needs high temperature and long diffusion time to obtain an ordinary polarized waveguide with a single polarization direction. This fabricating manner has a disadvantage with a poor optical confinement.

The fabrication method for the Y-like polarization splitter on the $LiNbO_3$ crystal substrate typically includes three technologies to have an input end that is a random polarization waveguide, one output end that is an extraordinary polarization waveguide with a single polarization direction, and another output end is an ordinary polarization wave guide. The extraordinary polarization waveguide can be fabricated by manners of magnesium-oxide diffusion or proton exchange, and the ordinary polarization waveguide cab be fabricated by nickel diffusion. Due to the property of single polarization direction, the splitter has a high optical extinction ratio between, for example, the TE mode and the TM mode. However, the technologies above cannot fabricate a Y-like structure with a branching angle greater than 2 degrees. This also indicates that the dimension of the polarization splitter cannot be effectively reduced for the conventional technologies. The nickel diffusion manner needs high temperature and long diffusion time to obtain an ordinary polarized waveguide with a single polarization direction. Further still, the optical confinement for the waveguide is also poor.

Recently, some waveguide products have been developed to have a wide branching angle with good optical transmission, such as a prism type or a substrate prism type with a large branching angle, in which the substrate prism type needs only once of photolithography process. However this technology has not been applied to a polarization splitter yet.

SUMMARY OF THE INVENTION

The invention has at least an objective to effectively reduce the area of a polarization splitter and to solve the conventional poor optical confinement for the polarization splitter having an ordinary polarization waveguide at a single polarization fabricated by nickel diffusion.

As embodied and broadly described herein, the invention provides a wide-angle polarization splitter with a Y-like structure that is a combination from a straight waveguide and a bent waveguide with a substrate-prism. The straight waveguide is formed by a nickel waveguide having a random polarization direction. The bent waveguide is formed by a manner of proton exchange. The two waveguides have an overlapping portion, where is called as a nickel-diffusion/proton-exchanged waveguide. An input portion of the straight waveguide of the Y-like structure needs a random polarization waveguide A method for fabricating a Y-like waveguide provided by the invention needs only once of nickel diffusion and once of proton exchange. At a branching portion of the Y-like waveguide includes a substrate prism region. The design with the proton exchanged waveguide and the substrate prism region can only bend an optical component having extraordinary polarization. The light component having the ordinary polarization direction remains in the nickel waveguide. The polarization splitter thereby has a high optical extinction ratio. The device area can therefore be reduced, and the device integration is effectively increased. Further still, since the polarization splitter includes only the nickel-diffusion waveguide with random polarization, its output has a better optical confinement on the ordinary polarization waveguide.

The present invention has an objective to provide a method for fabricating a wide-angle polarization splitter. The polarization splitter includes a nickel waveguide allowing a random polarization input, and a proton exchanged waveguide with a wide bend angle. Thereby, a wide-angle polarization splitter is fabricated to have a high optical extinction ratio and the wide branching angle. The device area can be effectively reduced, resulting in the improvement of device integration. The optical confinement for the ordinary polarization is also effectively improved.

The method of the present invention needs only once of nickel diffusion and a proton exchange. A nickel diffusion process is performed on the nickel strip, formed on a substrate, at a temperature about 700° C.–1000° C. for a period of time about 10–600 minutes. A nickel waveguide with random polarization direction is formed on the crystal substrate. A photolithography process with a photomask, which is used for fabricating a wide-angle bent waveguide in a substrate-prism type, is performed to deposit a silicon mask on the crystal substrate. The silicon mask is used to resist benzoic acid ($C_6H_5COOH$) used later. The silicon mask can be replaced with an aluminum mask or a titanium mask. The benzoic acid can also be replaced by pyrophosphoric acid ($H_4P_2O_7$). A proton exchange process with benzoic acid is to be performed on a portion of the crystal substrate exposed by the silicon mask. There is a portion of about 1 mm–5 mm of the nickel waveguide is exposed by the silicon mask, and is called as an overlapping portion. Preferably, the overlapping portion is about 4 mm. The crystal substrate is then dipped in the benzoic acid about 2–24 hours at a temperature of about 200° C.–240° C. for performing the proton exchange process. After the proton exchange process, the exposed portion of the crystal substrate, which typically has a strip with a bend angle from the straight waveguide, is the wide-angle bent waveguide, that is, a proton exchanged waveguide. The straight waveguide and the bent waveguide form together a Y-like polarization splitter. The silicon mask can be removed by HF acid.

The invention employs the single polarization property, and the property for the proton exchanged waveguide serving as an extraordinary polarization waveguide and the nickel waveguide serving as an ordinary polarization waveguide. Thereby, the optical extinction ratio is effectively improved, and the device area is effectively reduced. It is helpful to achieve high integration. Since the branching angle of the invention is greatly increased, this additionally allows the optical confinement is effectively improved to satisfy various practical applications.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The invention particularly use a straight waveguide to let the ordinary polarization wave pass and a bent waveguide to bent the extraordinary polarization wave. Since the bent waveguide is formed by a substrate prism type, a branching angle can be much greater than a convention Y-like polarization splitter.

Embodiment 1

Figure 1:
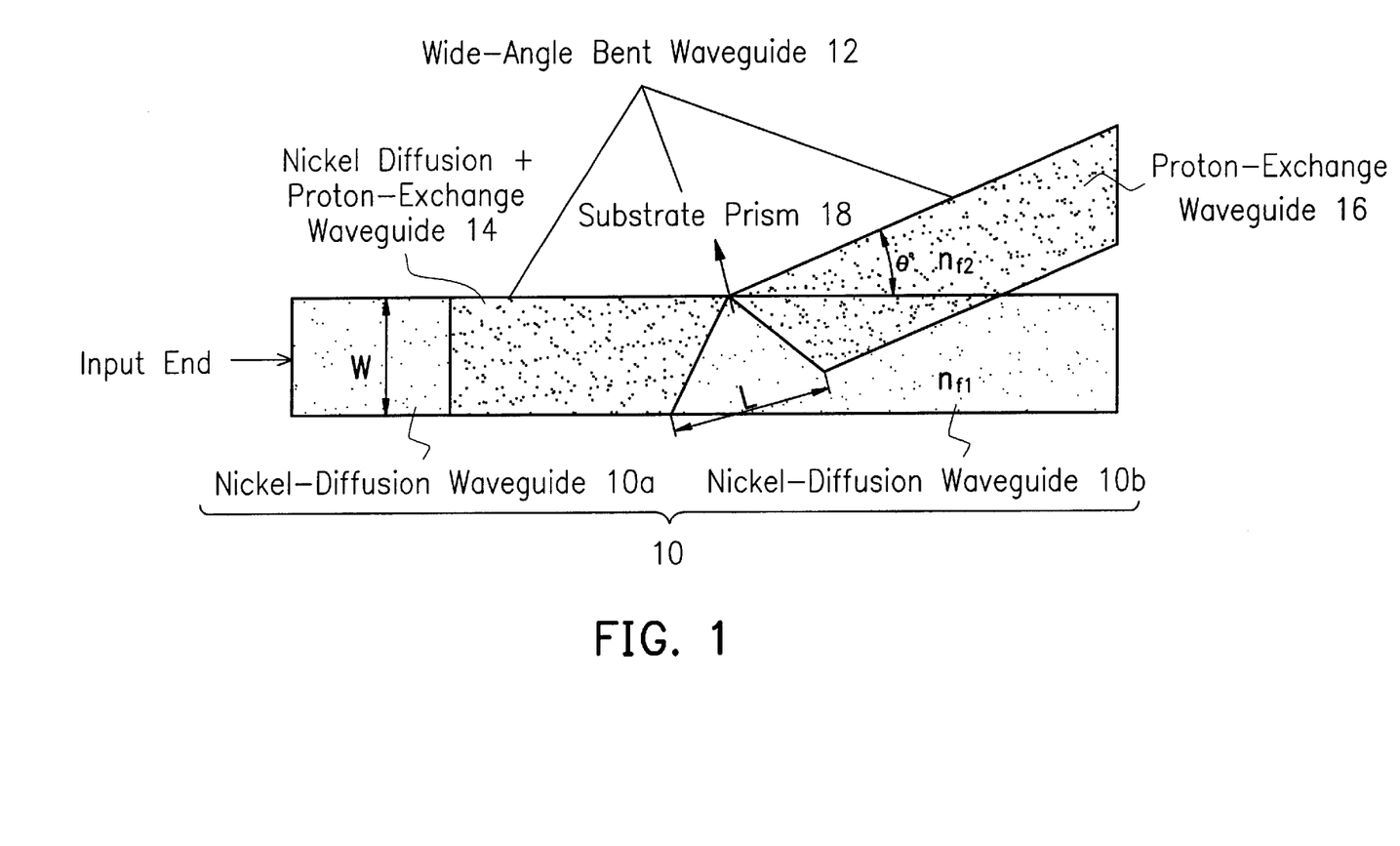
FIG. 1 is a top view, schematically illustrating a Y-like polarization splitter on a $LiNbO_3$ crystal substrate, according to a first preferred embodiment of the invention.

FIG. 1 is a top view, schematically illustrating a Y-like polarization splitter on a $LiNbO_3$ crystal substrate, according to a first preferred embodiment of the invention. In FIG. 1, a wide-angle Y-like polarization splitter includes a straight waveguide 10 and a wide-angle bent waveguide 12. The straight waveguide 10, for example, is formed by a nickel waveguide with random polarization. The wide-angle bent waveguide 12 is branching out from the straight waveguide 10 by a branching angle theta. The wide-angle bent waveguide 12, for example, is formed by a proton exchanged manner. Since the Y-like wide-angle bent waveguide 12 is branching from the straight waveguide 10, the straight waveguide 10 includes two portions 10a and 10b. The Y-like bent waveguide 12 includes a nickel-diffusion/proton-exchanged waveguide 14, a proton exchanged waveguide 18, and a substrate prism 18 used to connect the proton exchanged waveguide 16 and the nickel-diffusion/proton-exchanged waveguide 14. The proton exchanged waveguide 16 has the branching angle theta, or called as a bent angle theta, deviated from the straight waveguide 10. Since the substrate prism 18 is located in the straight waveguide region, the substrate prism 18 and the straight waveguide 10 have the same index of refraction $n_{f1}$. The proton exchanged waveguide 16 has an index of refraction $n_{f2}$ that is much greater than the index of refraction $n_{f1}$ for the straight waveguide 10, so that the substrate prism 18 causes a faster propagation speed for the extraordinary polarization wave. The relative index of refraction between the substrate prism 18 ($n_{f1}$) and the proton exchanged waveguide 16 ($n_{f2}$) is large, resulting in a large refraction angle. Moreover, the travelling length for the inner part and the outer part of the substrate prism is different. As a result, the electromagnetic wave can be bent in a large angle. The input portion of the wide-angle Y-like polarization splitter includes two regions: one is the nickel diffusion waveguide 10a and one is an overlapping portion 14 between the nickel waveguide and the proton exchanged waveguide. Both the regions 10a and 14 of the need a type of waveguide with random polarization direction. Since the proton exchanged manner can reduce the index of refraction of the ordinary polarization wave in the $LiNbO_3$ crystal, conditions for the nickel diffusion and the proton exchange need to be properly controlled, so as to achieve the property of random polarization in the overlapping portion 14. The substrate prism has a bottom length L, which satisfies a relation:

$$(n_f - n_s) \cdot L = 2 \cdot n_{eff} \cdot W \cdot \tan(\Theta/2) \cdot (n_s/n_f),$$

where W is the width of the straight wave guide 10, $n_f$ is the index refraction for the proton exchanged waveguide, $n_s$ is the index of refraction for the substrate, $n_{eff}$ is the effective index of fraction, and θ is the branching angle.

Figure 2:
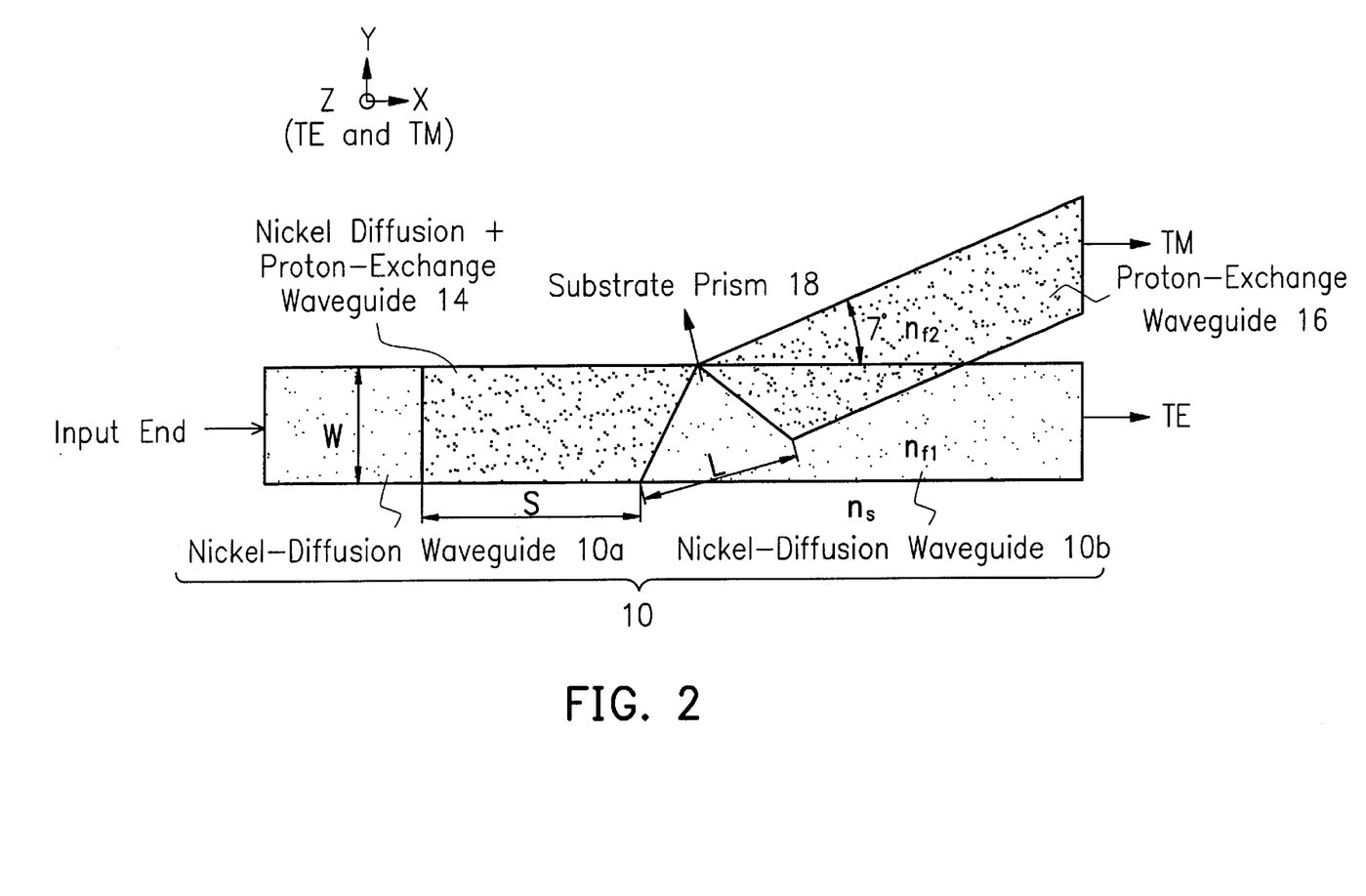
FIG. 2 is a top view, schematically illustrating a Y-like polarization splitter on a $LiNbO_3$ crystal substrate relating with electromagnetic waves, according to the first preferred embodiment of the invention.

FIG. 2 is top view, schematically illustrating a Y-like polarization splitter on a $LiNbO_3$ crystal substrate relating with electromagnetic waves, according to the first preferred embodiment of the invention. In FIG. 2, the wide-angle Y-like polarization splitter is formed on the $LiNbO_3$ crystal substrate normal to the z-axis. The branching angle θ for the proton exchanged waveguide 16 branching from the straight waveguide 10 is 7 degrees in this example. A range of about 2–20 degrees is allowable in the invention. The straight waveguide 10 is used for guiding the TE polarization wave, and the proton exchanged waveguide 16 is used for guiding the TM polarization wave.

Figure 3A:
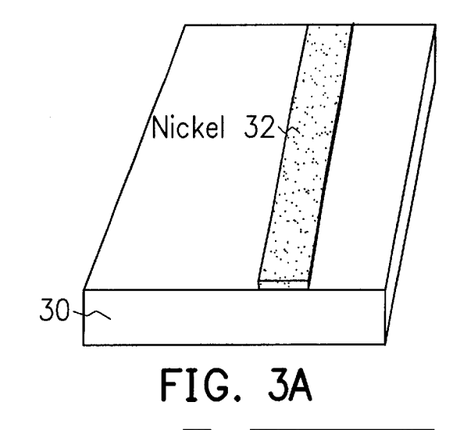
FIGS. 3A–3D are perspective views, schematically illustrating a fabrication process on the crystal substrate, according to the first preferred embodiment of the invention.
Figure 3B:
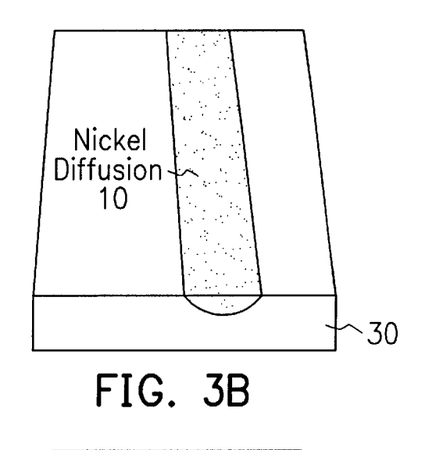
Figure 3C:
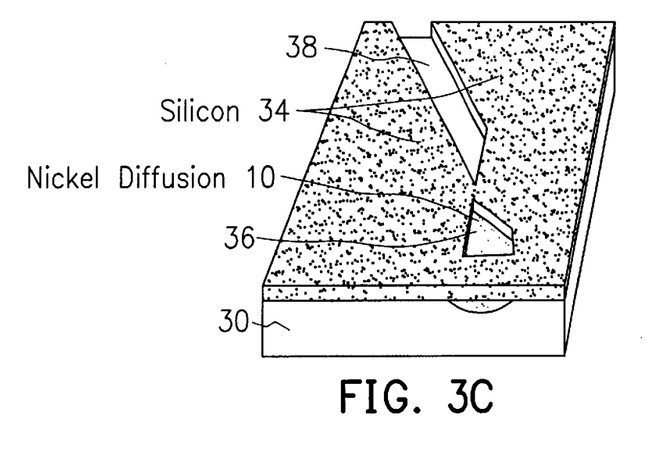
Figure 3D:
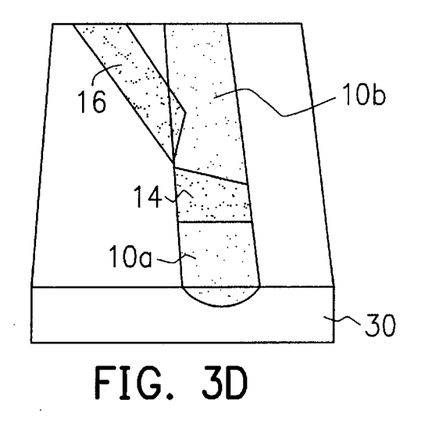

FIGS. 3A–3D are perspective views, schematically illustrating a fabrication process on the crystal substrate, according to the first preferred embodiment of the invention. Usually, the temperature for fabricating the nickel diffusion waveguide 10 is higher than the temperature for fabricating the overlapping portion 14 and the proton exchanged waveguide 16. In FIG. 3A, a lithium niobate ($LiNbO_3$) crystal substrate 30 is provided. The substrate surface is normal to the z-axis. A nickel strip 32 with a width of about four microns and a thickness of about 300 angstroms is formed on the substrate 30 by photolithography and lift-off or etching processes. In FIG. 3B, the substrate 30 is treated with a temperature of about 800° C. for diffusing the nickel strip 32, so as to preliminarily form a straight waveguide 10, that is, the nickel diffusion waveguide. The temperature in the invention allows a range of about 700° C.–1000° C. The duration time ranges from about 10 minutes to about 600 minutes, such as 65 minutes. In FIG. 3C, a silicon mask 34 is formed on the substrate 30 but exposes portions 36 and 38 of the substrate 30 where is reserved for forming the proton exchanged waveguide later. The silicon mask 34 can be formed by photolithography and etching processes with a photomask (not shown), like those typical technologies in semiconductor fabrication. The silicon mask 34 is used to resist benzoic acid used later for forming the proton exchanged waveguide 16 of FIG. 1. The substrate 30 then is dipped in benzoic acid ($C_6H_5COOH$) at a temperature of about 200° C.–240° C. for about 2–24 hours to perform the proton exchange process. Since the silicon mask 34 protects the substrate 30, the proton exchange process only occurs on the exposed portions 36 and 38. In the foregoing, the silicon mask 34 can be replaced by an aluminum mask or a titanium mask, and the benzoic acid can be replaced by pyrophosphoric acid ($H_4P_2O_7$). In FIG. 3D, after the proton exchange process, the silicon mask 34 is removed by HF acid. The proton exchanged waveguide 16 and the overlapping portion are formed on the substrate. The overlapping portion 14 is about 1 mm–5 mm, and preferably is about 4 mm. Similarly to FIG. 1 or FIG. 2, the proton exchanged waveguide 16 is branching from the nickel-diffusion straight waveguide 10a by a branching angle of 7 degrees. The substrate prism 18 is located between the overlapping portion 14 and the proton exchanged waveguide 16. The overlapping portion 14 includes effects of nickel diffusion and proton exchanged. A wide-angle Y-like polarization splitter is then formed on the $LiNbO_3$ crystal substrate 30.

Figure 4A:
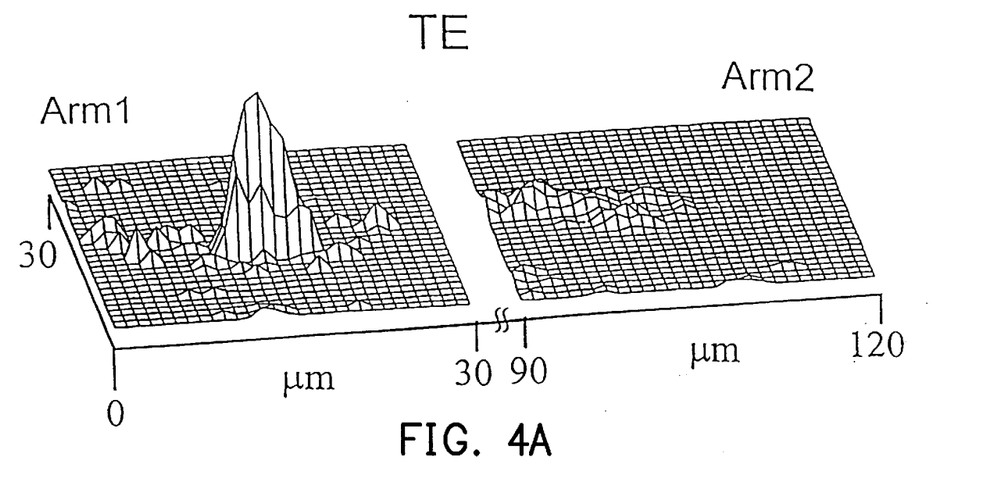
FIGS. 4A–4B are polarized signal amplitude distribution for a TE mode and a TM mode the Y-like polarization splitter in FIG. 2, according to the first preferred embodiment of the invention.
Figure 4B:
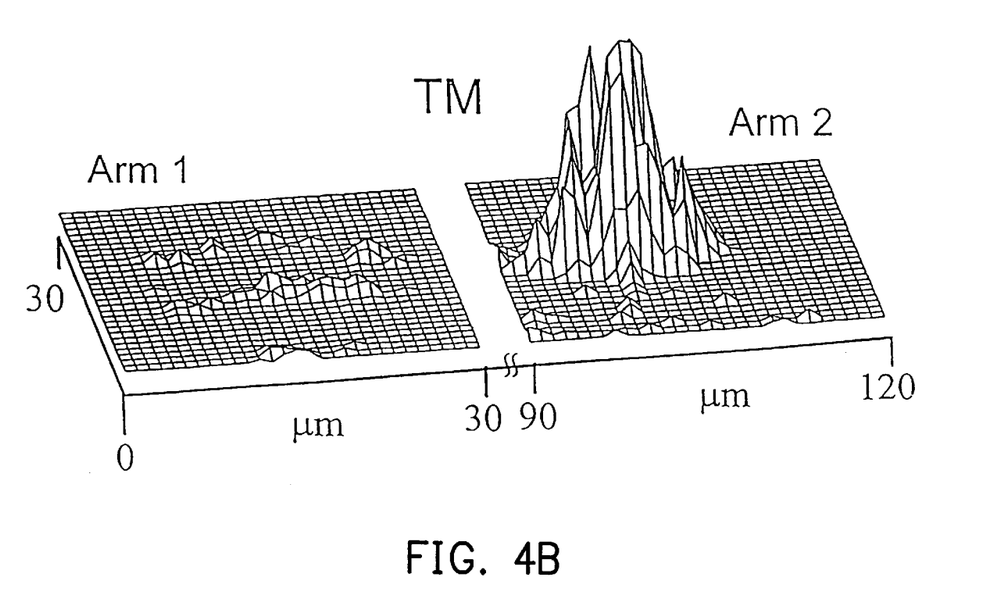

Some measurements to test the wide-angle Y-like polarization splitter of the invention are performed. FIGS. 4A–4B are polarized signal amplitude distribution for a TE mode and a TM mode for the Y-like polarization splitter in FIG. 2, according to the first preferred embodiment of the invention. FIG. 4A and FIG. 4B are the measured electromagnetic wave signals corresponding to the polarization angle of 90° and 0°, respectively, relative to the z-axis. Measured signal amplitudes are distributed on a plane, where the measurement is taken, normal to the longitudinal direction of the waveguide. The Arm1 indicates the nickel-diffusion straight waveguide 10, and the arm2 indicates the proton exchanged waveguide 18. For the TE mode with polarization angle of 0°, signals can only be measured at Arm1 for the nickel-diffusion straight waveguide 10. For the TM mode with polarization angle of 90°, signals can only be measured at Arm2 for the proton exchanged waveguide 16. For an electromagnetic wave with wavelength of 0.6328 microns, the optical extinction ratio is about 26 dB for the TE mode and about 28 dB for TM mode. The transmission for the TE mode wave is about 25%, and the transmission for the TM mode wave is about 40%.

Preferred fabrication conditions for the wide-angle Y-like polarization splitter are, for example, shown in table 1

| Fabrication Process | Width | Temperature | Duration |
|---|---|---|---|
| Nickel diffusion | 7 microns | 800° C. | 65 min. |
| Proton exchange | 9 microns | 240° C. | 9 hrs. |

Embodiment 2

Figure 5:
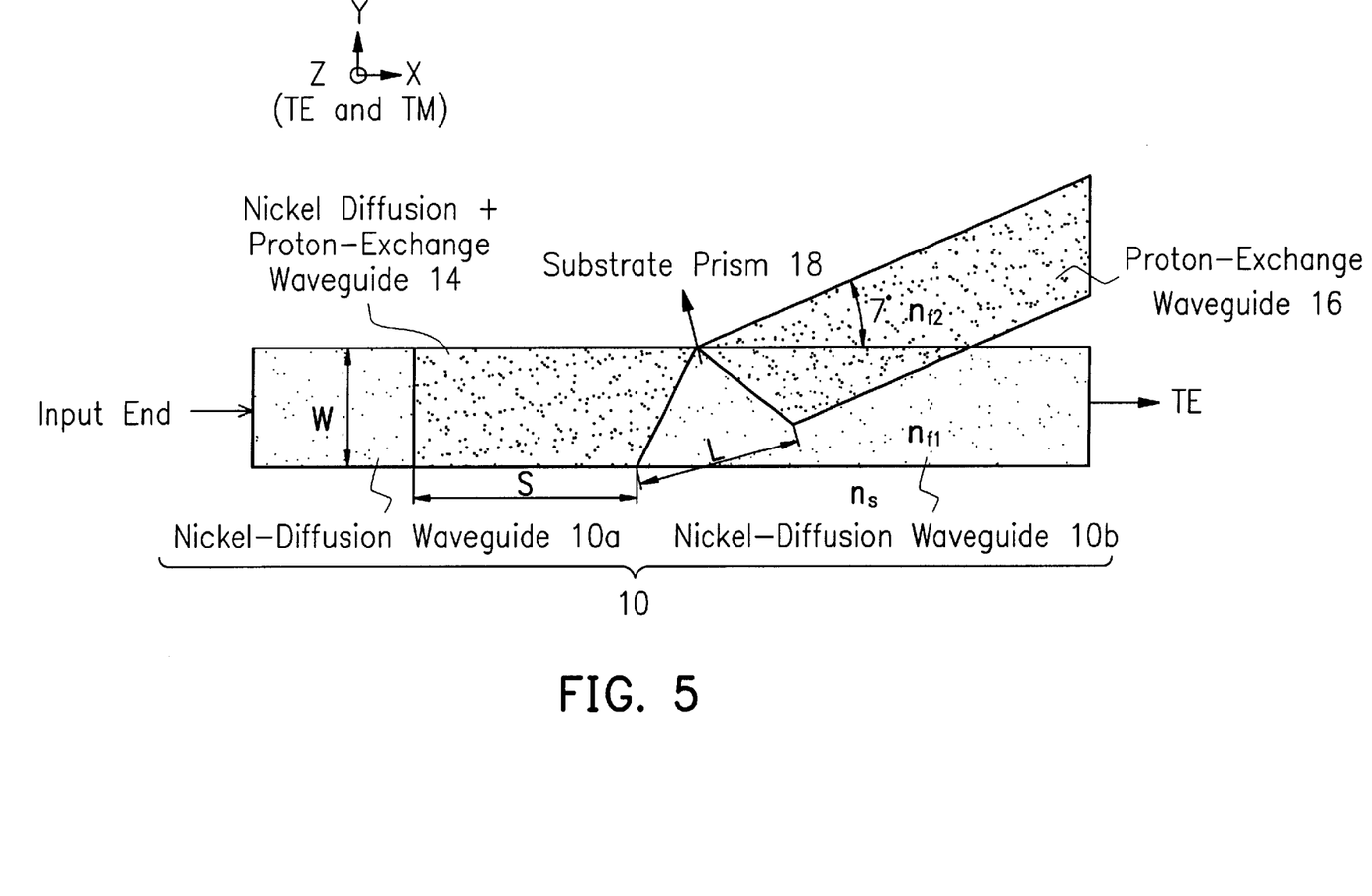
FIG. 5 is a top view, schematically illustrating a polarizer for a single ordinary polarization direction, according to a second preferred embodiment of the invention.

FIG. 5 is a top view, schematically illustrating a polarizer for a single ordinary polarization direction, according to a second preferred embodiment of the invention. The structure as shown in FIG. 5 is similar to the one shown in FIG. 2, but only the nickel-diffusion straight waveguide 10 has output, so that the Y-like polarization splitter is used as a polarizer for a single ordinary polarization direction.

Figure 6A:
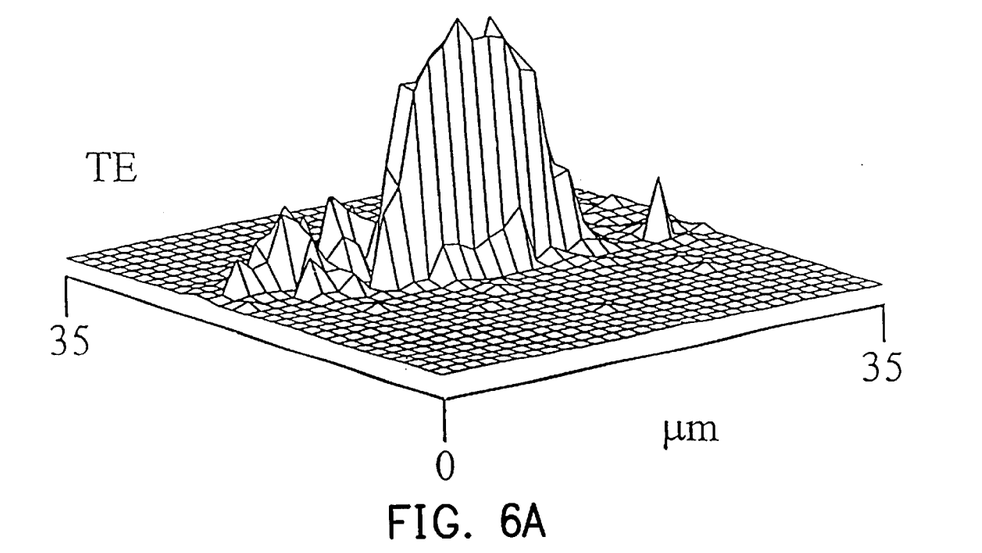
FIGS. 6A–6B are polarized signal amplitude distribution for a TE mode and a TM mode for the polarizer in FIG. 5, according to the second preferred embodiment of the invention.
Figure 6B:
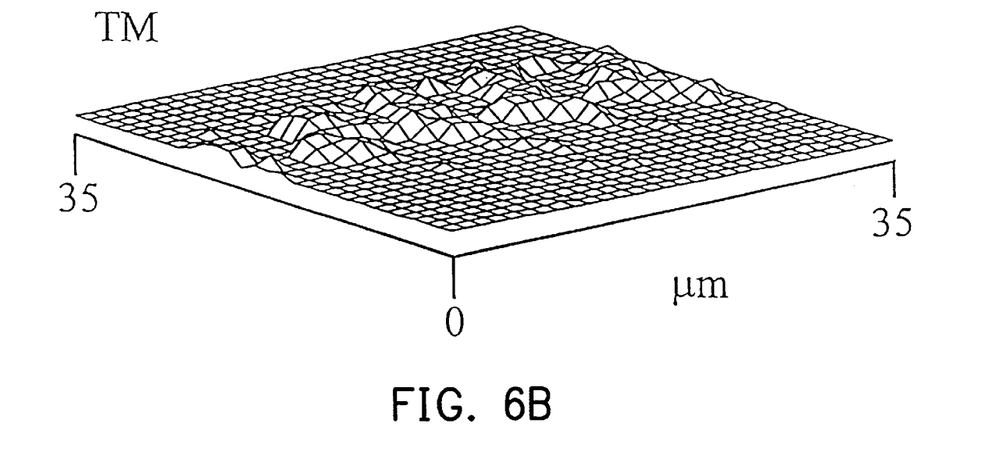

FIGS. 6A–6B are polarized signal amplitude distribution for a TE mode and a TM mode for the polarizer in FIG. 5, according to the second preferred embodiment of the invention. FIG. 6A and FIG. 6B are the measured electromagnetic wave signals corresponding to the polarization angle of 90° and 0°, respectively, relative to the z-axis. Measured signal amplitudes are distributed on a plane, where the measurement is taken, normal to the longitudinal direction of the waveguide. As the electromagnetic wave with a wavelength of 0.6328 micron is inputted to the polarizer, the signal output for the polarization angle of 90 degrees (TE mode) is observed as shown in FIG. 6A. For the wave with the polarization angle of 0 degree (TM mode), there is no output observed. The extinction ratio for this wave source is 24 dB.

In conclusion, the invention has several advantages as follows:

1. The Y-like polarization splitter of the invention has a greater branching angle, so that the device area is effectively reduced, and integration is also effectively improved.
2. The Y-like polarization splitter of the invention has a larger optical extinction ratio to satisfy various applications.
3. The polarizer of the invention has a larger optical extinction ratio and better optical confinement.
4. The Y-like polarization splitter and the polarizer of the invention are fabricated by a greatly simplified process. It allows massive production.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A polarization splitter, comprising:
   a Y-like waveguide formed in a substrate with one input end and two output ends, wherein the Y-like waveguide comprises:
   a nickel-diffusion straight waveguide; and
   a substrate-prism type proton exchanged bent waveguide having an overlapping portion with the straight waveguide at a first end, and a bent portion at a second end branching out from the nickel-diffusion straight waveguide by a branching angle.

2. The polarization splitter of claim 1, wherein the substrate comprises lithium niobate (LiNbO$_3$).

3. The polarization splitter of claim 1, wherein the branching angle is greater than about 2 degrees and less than about 20 degrees.

4. The polarization splitter of claim 1, wherein the overlapping portion comprises a portion of the nickel-diffusion straight waveguide and a portion of the substrate-type proton exchanged waveguide.

5. The polarization splitter of claim 1, wherein the substrate-type proton exchanged waveguide comprises a substrate prism between the overlapping portion and the bent portion, so as to bend electromagnetic waves with a polarization mode inherently carried by the proton exchanged waveguide.

6. The polarization splitter of claim 5, wherein a refractive index of the substrate prism is equal to a refractive index of the nickel-diffusion straight waveguide, but is smaller than a refractive index of the proton exchanged waveguide.

7. The polarization splitter of claim 1, wherein the polarization splitter serves as a polarizer by taking signals from only one of the two output ends.

* * * * *